United States Patent [19]
Mott

[11] Patent Number: 4,477,509
[45] Date of Patent: Oct. 16, 1984

[54] DISPOSABLE LID FOR POTS, PANS AND LIKE RECEPTACLES

[76] Inventor: Joseph J. Mott, 4865 Walden La., Kettering, Ohio 45429

[21] Appl. No.: 409,454

[22] Filed: Aug. 19, 1982

[51] Int. Cl.³ .............................................. B32B 15/08
[52] U.S. Cl. ............................ 428/198; 229/3.5 MF; 428/461; 428/462; 428/906
[58] Field of Search ................. 229/3.5 MF; 206/389, 206/525; 220/272; 428/43, 461, 462, 198

[56] References Cited

U.S. PATENT DOCUMENTS

| | | | |
|---|---|---|---|
| 2,400,390 | 5/1946 | Clunan | 229/3.1 X |
| 2,902,396 | 9/1959 | Reynolds | 428/464 X |
| 3,411,433 | 11/1968 | Christopher | 428/131 X |
| 3,750,873 | 8/1973 | Roman | 229/3.5 MF X |

*Primary Examiner*—Henry F. Epstein
*Attorney, Agent, or Firm*—Jerome P. Bloom

[57] ABSTRACT

A disposable lid for pans, pots and other receptacles, particularly advantageous for use in ovens, comprising a plurality of layers of flexible material the outer of which is a foil and the inner of which is a thin film of plastic, known as a food service film, having the property to per se releasably attach to the surface of an article on a light pressured contact therewith. The lid is simply created by bringing sheets of the respective materials of its plurality of layers to a superposed contacting relation and applying thereto a relatively light pressure and tension causing the facing surfaces of such sheets to substantially coextensively contact and attach under conditions of ambient temperature and without application of intervening adhesive material. Simple apparatus facilitating the production of the lids in a kitchen, as, when and in a form required, comprises a receptacle accommodating or formed to provide means defining separate compartments each receiving a supply of a different one of the materials of the respective layers of material of the lid in sheet form, bearing means to which the sheets of material are simultaneously drawn from the respective compartments, under tension, to be applied thereto in a superposed contacting relation and per se be pressured thereby to produce a unitized layered structure, and means for separating said layered structure into segments each of which comprises a single lid.

9 Claims, 5 Drawing Figures

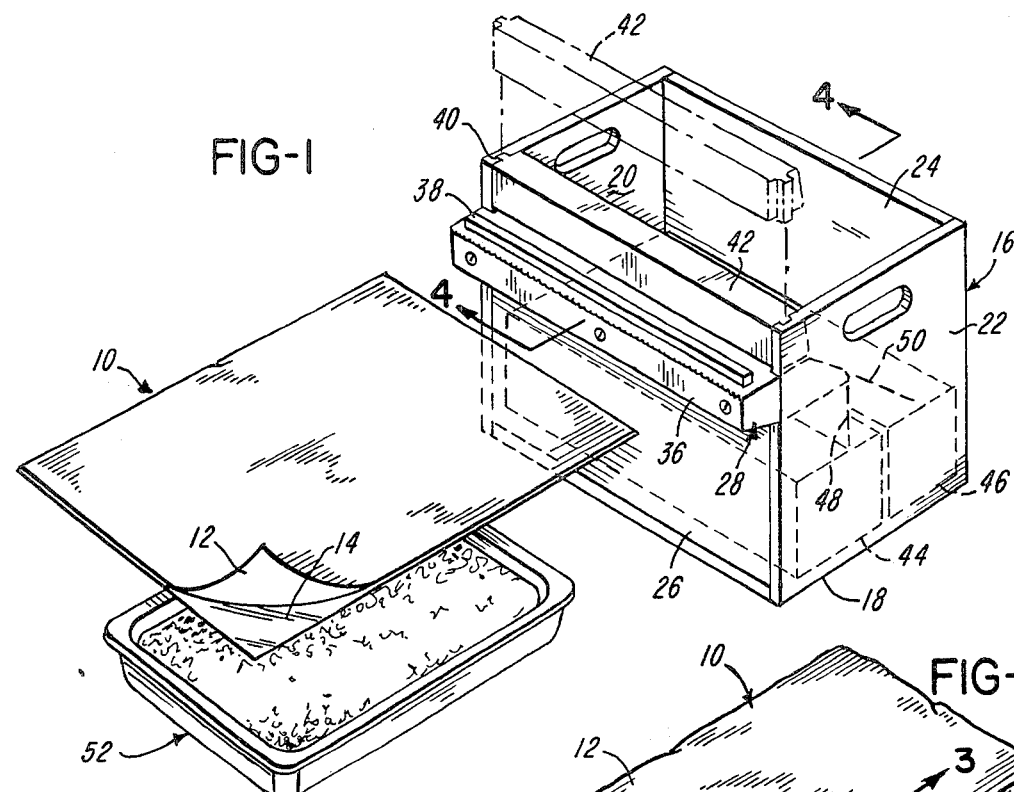
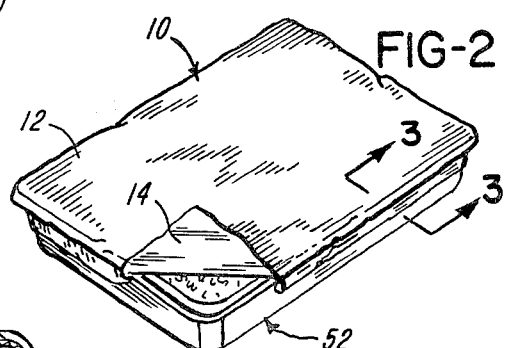
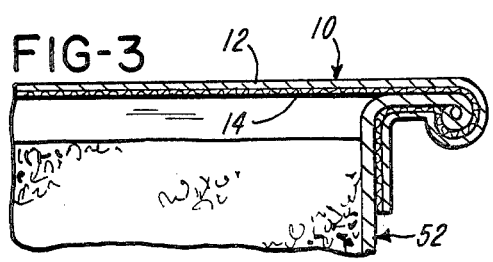
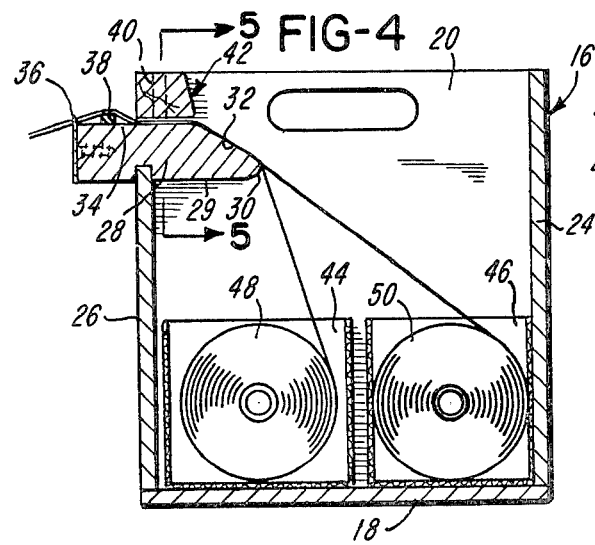
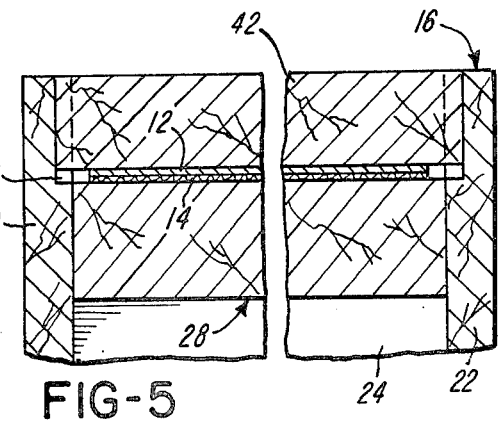

DISPOSABLE LID FOR POTS, PANS AND LIKE RECEPTACLES

BACKGROUND OF THE INVENTION

This invention relates to a new and improved disposable lid for pots, pans and like receptacles and a method for fabricating the same as well as a method for its use. Embodiments are distinguished by being economical and simple to fabricate, efficient and satisfactory in use, adaptable to a wide variety of applications and capable of insuring a high degree of cleanliness and conservation of energy in a cooking, baking or heating procedure.

Embodiments of the invention are particularly suited for use in the catering business. They will be so described, but only by way of example and not by way of limitation either as to the scope of their application or the form or character of their embodiment.

The catering of food is a demanding business, the conduct of which presents a multitude of problems. It entails a considerable amount of preparation and storage of fresh and cooked food on a daily basis; the cooking, baking and/or heating of food in quantity, using equipment and ovens under conditions that are oftentimes less than satisfactory; storage and transportation of prepared food, the latter over distances which are sometimes excessive, particularly when considering that the food must be kept at a proper temperature level during transportation; and oftentimes a need to reheat or complete the cooking of food at its eventual place of use.

A particular problem exists in respect to the handling of food that must be cooked, baked or otherwise heated. This usually creates a need for frequent, costly and time consuming cleanup. This stems from the fact that the pans of food placed in the ovens are normally well filled and the contents generally include a considerable amount of liquid. As the temperature of the ovens is elevated to and over 212° F., as often occurs, the liquid in the pans will invariably bubble up and over their sides and onto the inner wall surfaces of the oven structure. As a result, a caterer is immediately faced with the requirement of the removal of the mess so created in order that he might maintain a sanitary environment for the food handled in his establishment. Furthermore, spillover of food from the pans, both liquid and solid, will often occur in transit of the food to and from the ovens and to a place of temporary storage, necessitating additional cleanup in this connection. In many cases a caterer will employ lids with his pans in an effort to avoid the above described problems. This normally requires a considerable and costly inventory of lids and it is extremely costly to obtain lids and pans which in the use thereof within an oven will avoid the spillover of liquid materials in the cooking, baking or heating process which is conducted in the oven. The caterer does have the option of purchasing a very heavy pan and lid assembly which is relatively tight but the weight of such an assembly is usually prohibitive in view of the limited physical capacity of many of the caterers' employees. Given a heavy pan and the pan being filled almost to the brim with food, the load is considerable and this in itself tends to negative the use of such equipment in a busy establishment, apart from its cost.

The present invention affords means and a method for solving the above mentioned problem and at the same time lends additional significant benefits to a catering operation.

To the best of his knowledge and belief the present inventor is not aware of any prior use or practice of his invention, either as to the form of its embodiment or the nature and character of its application as herein set forth and made subject of his claims.

SUMMARY OF THE INVENTION

Embodiments of the present invention provide a disposable lid for pans, pots and other receptacles, particularly advantageous for use in ovens, susceptible to maintaining its structural integrity when subjected to extremes in temperature. A typical embodiment comprises a plurality of layers of thin flexible material the outer of which is heat reflective and the inner of which is adapted per se to releasably attach to the surface of a receptacle to which the lid is applied.

A preferred embodiment of a lid per the invention is comprised of a sheet of aluminum foil and a sheet of thin plastic film, known in the catering trade as a food service film or "polyfilm", which per se, and without intervening adhesive, are placed in substantially coextensive direct bearing contact under a relatively light pressure and by virtue of such contact attached to form a unitized substantially integrated structure. The plastic film is in this case one inherently capable of releasably adhering to the surface of a pan, pot or other receptacle.

The lid of the invention may be very simply and easily created, for example, by superposing sheets of the material which form its multi-layered structure and applying them to bearing means while subjecting them to a relatively light tension and pressure to produce a smoothing and substantially coextensive contact between adjacent surfaces thereof by virtue of which and by virtue of the inherent property of the plastic film which forms the innermost surface of the lid producing an integrated structure which is thereafter segmented by cutting, tearing or similar procedure to provide lids which are in a desired size and/or shape.

The invention further provides apparatus for producing disposable lids for pans, pots or other receptacles which may be utilized in a kitchen comprising a container arranged to provide therein means defining a plurality of compartments including one accommodating a thin plastic film in sheet form having the property of adhering to a surface of an adjacent article on contact therewith and a second compartment for a foil in sheet form, there being relatively smooth bearing means to which the thin plastic film and foil are separately directed to be brought together in superposed contacting relation by bearing contact with the bearing means to form thereby a substantially integrated multi-layered sheet-like structure which is directed to the exterior of the vessel for cutting, tearing or otherwise separating the same into individual lids.

As applied to a receptacle to cover its contents, the nature and character of the lid is such that by virtue of the embodiment of the plastic film and the multi-layered structure of the lid to form its innermost surface the lid may be easily formed, molded and releasably attached to the receptacle to which it is applied and in the event of the receptacle being placed in an oven and subjected to heat approaching 400° F. the seal of the contents and of the lid to the receptacle is tightly maintained thereby to form a steam dome for the receptacle, in respect to its contents, which substantially speeds up the cooking, baking or other heating process being conducted. In spite of the vulnerability of plastic film to the extremes of temperature described, as protected by and retained to the receptacle by the outer sheet of foil, the structural integrity of the plastic film is preserved. This eliminates the incidence of spillover of liquid or food from the pan in the ovens, maintains an unusual cleanliness within the oven and saves a considerable amount of cleaning and down time for the oven as far as the caterer is concerned. The benefits are clearly obvious. Furthermore, with retention of the lid on the receptacle subsequent to its contents being cooked, baked or heated in the oven, the receptacle and its contents may be carried without spill or leakage for temporary storage in the refrigerator or in a vehicle by means of which it is to be transported to the place where the contents of the receptacle is to be dispensed.

A feature of the invention lid is that at such times when it is desired to inspect the food during the cooking, baking or heating process, since the integrity of the lid structure including its plastic inner layer is maintained and protected by the foil, the lid may be peeled back for such inspection and then reapplied in place for further subjecting its contents to heat and to maintain a seal of the receptacle and correspondingly the benefits which are achieved by the application of the lid as above described.

It is therefore a primary object of the invention to provide a unique disposable lid for receptacles the contents of which are to be subjected to extremes of temperature, including cooking, baking or heating in an oven up to 400° F. and higher which is economical to fabricate, efficient and satisfactory in use, adaptable to a wide variety of applications and unlikely to malfunction.

Another object is to provide a simple and effective means and method for creating a disposable lid for pots, pans and other receptacles capable of creating a seal thereof and correspondingly a seal of its content enabling in the use thereof a shortening of the time required for cooking, baking and/or heating of its contents.

A further object is to provide a disposable lid for receptacles capable of use in cooking, baking or heating which is unitized multi-layered flexible sheet-like structure.

An additional object of the invention is to provide a multi-layered lid structure for receptacles used in cooking, baking or heating comprised of layers of plastic film and a foil of sheet form wherein the foil serves to protect and maintain the structural integrity of the plastic film during the subjecting of the lid to high temperatures within an oven.

A further object of the invention is to provide a disposable lid capable of creating and maintaining a steam dome for the contents of a receptacle subject to cooking, baking and heating at elevated temperatures.

Another object of the invention is to provide a simple means for assembling a disposable lid per the invention.

A further object of the invention is to provide a disposable lid for a cooking, baking or heating receptacle and a means and method of its creation and application possessing the inherent meritorious characteristics, the structural features and means and mode of use in application thereof herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are illustrated various aspects of the present invention and form of its embodiment, FIG. 1 is a perspective exploded view of a lid in accordance with the invention, apparatus for the creation thereof and the facility of applying the lid to a pan the contents of which are to be transported, stored and/or cooked, baked or heated in an oven at relatively high temperatures;

FIG. 2 is a perspective view of the receptacle of FIG. 1 as covered and sealed by the lid of the invention, the lid being shown peeled back in part for inspection of the contents of the receptacle as and when required;

FIG. 3 is a view taken on line 3—3 of FIG. 2;

FIG. 4 is a cross sectional view of a means for creating the lid of the invention, taken on line 4—4 of FIG. 1; and FIG. 5 is a cross sectional view taken on line 5—5 of FIG. 4.

Like parts are indicated by similar characters of reference throughout the several views.

A preferred embodiment of a lid 10 per the present invention, as shown in the accompanying drawings, is comprised of two layers of thin, flexible sheet material. The outer layer 12 is made of foil, preferably an aluminum foil. The inner layer 14 is a thin plastic film, known in the catering trade as a food service film or a "polyfilm". The latter is distinguished by an inherent ability to adhere to the surface of other objects on contact. The outermost surface of the inner layer 14 of the lid 10 is in a substantially coextensive, contacting, adherent relation to the innermost surface of its outer layer 12. The structure so provided is thus an integrated structure and one which is characterized by a total absence of any adhesive or other bonding material between its layers and by the fact the layers 12 and 14 retain their full individual identity and structural integrity. More than this the integration is one achieved under conditions of ambient temperature and with the application of only a light pressure and tension to produce the adherent substantially coextensive contact between the superposed layers.

It has been found that once the layers 14 and 12 are in substantially coextensive contact, the separation thereof, one from the other, is virtually impossible to achieve. Even more important is the fact that in the composition of the lid as described both the strength and utility available in the individual layers of the foil and the film are inobviously and substantially increased.

When, for example, the lid is applied as a cover for a pan the contents of which are to be cooked, baked or otherwise heated in an oven, the inner layer 14 provides means to adherently attach the lid to and about the outer periphery of the pan to cover and seal therein its contents. The foil of the outer layer 12 affords a heat reflective shield and a reinforcing backing for the plastic film, assisting it in its firm though releasable attachment to the surface of the pan. When the pan so covered is carried to and introduced to an oven, its contents will be fully contained and spilling of any portion thereof will be avoided. As the so covered pan is subjected to rising temperatures in an oven, it has unexpectedly been found that the integrity of the plastic film 14 is preserved by its heat reflective outer layer 12 and it does not deteriorate or disintegrate even when the temperature of the oven rises to 400° F. and somewhat higher.

Furthermore, it has been established that in use of the lid 10 in an oven it produces a steam dome over the contents of the pan or other receptacle to which it applies which accelerates the baking, cooking or heating thereof. It is so effective in this respect that there are times during the process when the caterer will peel the lid 10 back to allow moisture, namely steam, to escape from the pan to insure the type of end result he desires. The preservation of the inherent characteristics of the multi-layered structure of the lid enables the peeled back portion thereof to be returned to its previous full covering and sealing relation to the pan.

A characteristic result of the use of the lid on a pan placed in an oven is that it insures against the contents bubbling or spilling over the outer surface of the pan and onto the inner wall surfaces of the oven. The oven is thus maintained relatively clean and the exterior of the pan is maintained substantially as clean as when it was inserted in the oven. If, upon removal of the pan from the oven, the lid remains in covering relation to the pan and its contents, the contents will continue to maintain an elevated temperature for an extended period of time. An added benefit of the lid is that as long as the lid is applied to the pan its contents are so contained as to prevent spills or leaking of liquids or food from the pan when placed in a storage receptacle or transported. These are significant benefits which accrue, of particular advantage to the caterer when the food must be immediately transported for serving at a place which is a considerable distance away from the location of the oven.

It will be obvious from the foregoing that the lid 10 may be simply and inexpensively created and used in any kitchen to obviate the need for a substantial amount of cleanup and mess in the preparation and processing of food, as well as in the packaging and sealing thereof for storage and transport. In addition to this, the use of the simple lightweight disposable lid introduces substantial economies and utility in a kitchen operation. Its ability to conserve energy in a cooking, baking or other heating procedure is also of considerable importance, as is its ability to reduce the time entailed in such procedures. The invention is thus particularly advantageous for use in a catering operation, particularly in view of its ability to obviate the need for extensive, difficult and time consuming cleanup procedures which can seriously interfere with the efficiency of the catering operation as well as its cost. It is of particular interest that the lid unexpectedly can create the substantial equivalent of a pressure cooker.

The drawings illustrate a very simple portable apparatus and method for creating and applying the lid 10. This apparatus is particularly shown in FIGS. 1, 4 and 5, in a generally schematic form. The apparatus includes a rectangular shell 16 forming a housing comprised of a base 18, side walls 20 and 22, a back wall 24 and a front wall 26. The walls 20, 22, 24 and 26 rise perpendicular to the base 18 and join at right angles to the adjacent wall elements. The side and back walls have the same vertical depth while the front wall 26 is shorter in depth, its upper limit being in a line parallel to the base 18 and relatively adjacent and spaced from the uppermost limit of the side walls 20 and 22.

A bar 28 mounted on, secured to and coextensive in length with the uppermost edge of the front wall 26 extends to bridge the side walls 20 and 22 of the receptacle 16. The bar 28 has a horizontal attitude. In the example illustrated the undersurface of the bar 28 has a longitudinally extending groove, from one end to the other, spaced between its inner and outer limits (as referenced to the receptacle 16) which accommodates the upper edge portion of the front wall 26 and affords a balanced seat for the bar 28 as it is suitably secured in place.

One longitudinally extending edge of the bar 28 is positioned forwardly and outwardly of the front wall 26 while its opposite longitudinally extending edge is projected rearwardly of the front wall 26, in the direction of the back wall 24. The portion of the transverse width of bar 28 which projects inwardly of the receptacle is wider than that which projects outwardly thereof. The outermost longitudinally extending face of the bar 28 lies in a vertical plane perpendicular to that of the base 18 and has fixed thereto, in a coextensive abutting relation, a plate-like cutter element 36 the uppermost edge of which projects upwardly from the uppermost surface of the bar 28 and has a serrated edge. The undersurface 29 of the bar 28 is parallel to the plane of the base 18 as is its uppermost surface portion 34 which extends inwardly from the cutter element 36 a distance to provide that there is an equal projection thereof outwardly from the front wall 26 as inwardly thereof. From the line defining the innermost limit of the portion 34, which is parallel to its outermost edge, the upper surface portion 34 is extended by an inwardly and downwardly inclined portion 32. The innermost limit of the surface portion 32 is tangent to the uppermost portion of the innermost edge 30 of the bar 28 which arcuate in cross section, the arc thereof being formed on a small but uniform radius. The inner surfaces of the side walls 20 and 22 of the receptacle 16 each have a vertically oriented groove 40, substantially rectangular in cross section, which extends from its uppermost edge down to the plane of the surface portion 34 of the bar 28. The grooves 40 are in a direct transverse alignment and positioned slightly inward from and parallel to the front wall 26. These grooves serve to slidably receive therein complementarily shaped tongue portions which are integral with and projected from the ends of a bar 42, which on slip fit to the receptacle by application of its tongue portions in the grooves 40 provides that the lower surface thereof drops to and is positioned immediately of the part of the surface portion 34 of the bar 28 between the plane of the outermost surface of the front wall 26 and the innermost limit of the surface portion 34.

Two compartments, respectively 44 and 46, are suitably provided or formed on the base 18 of the receptacle 16. These compartments extend from side wall 20 to side wall 22, one being adjacent and parallel to the front wall 26 and the other adjacent and parallel to the back wall 24. Both compartments are shown as open at the top. The compartment adjacent the front wall 26 accommodates a roll 48 of the plastic film previously described, in sheet form. The other compartment receives therein a roll 50 of a metallic foil, preferably aluminum, in sheet form.

It will be obvious, of course, that the receptacle 16 will be capped by a releasable cover, if so desired.

In the use of the apparatus just described for fabricating a lid 10, as and when required, the leading end portions of the sheet materials 14 and 12 of the rolls 48 and 50 are separately drawn upwardly to and superposed as they are directed over the upper surface of the bar 28. As the leading end portions of the superposed sheet materials 14 and 12 are passed over the upper surface of the bar 28, they will first move over and bear on the surface portion 32 and then on the part of the surface portion 34 between the portion 32 and the plane of the outer surface of the front wall 26. Beyond this point the superposed sheets are slightly elevated as they pass over a rib 38 of rubberlike material which is fixed perpendicular to the surface portion 34 at a location parallel to the cutter 36 and relatively centered between the cutter and the plane of the front wall 26. The projection 38 is rectangular in transverse section and it runs the length of the bar 28. Outwardly of the projection 38 the superposed sheets dispose over the serrated edge of the cutter plate 36. For the first setup of the apparatus and the initial drawing out of the material to bear on the bar 28 as described, the bar 42 is removed from the receptacle 16. As soon as the material is in place to commence the production of lids, the bar 42 is slip fit in connection with the receptacle 16, as previously described, to have its undersurface in a superposed bearing relation to the upper layer of the superposed sheet material, in a lightly pressured relation thereto and to the multi-layered structure of which it forms a part. As will be seen, the layer of foil will be outermost of the superposed sheets and in contact with the bar 42.

As will be obvious, on grasping the outermost ends of the superposed sheets of film and foil and drawing them outwardly with reference to the receptacle, a light tension is applied to the multi-layered sheet structure as the layers thereof are caused to superpose and bear on the upper surface of the bar 28. As the so tensioned and bearing superposed sheets of film and foil are passed between the bar 42 and the bar 28, the bar 42 applies a relatively light pressure sufficient, however, to cause a smoothing of the sheets of the material in their superposed relation thereby to insure a substantially coextensive contacting relation therebetween as they are drawn outwardly of the receptacle. As will be obvious, once the leading end portions of the superposed sheets which have not been lent the benefit of the "ironing out" operation of the bar 42 are severed from the following portion which has had the benefit of the application of the bar 42, one can in drawing the materials from the receptacle create, as and when required, a multi-layered lid to suit any particular application. The rib 38 facilitates the procedure by serving well as a point of reference to anchor the sheets as a lid is severed therefrom and due to the elevation of the outer end of the superposed sheets which form the lid adjacent the cutter element 36, it is easy to grasp the leading edge of the multi-layered structure to initiate the creation of a subsequently required lid.

FIG. 1 of the drawings illustrates how simply and effectively one can utilize the apparatus for producing the lid, on site. As there shown, a pan 52 filled with food is placed immediately of the front wall 26 of the receptacle 16 in a position that one requiring a lid may draw out the multilayered structure which he creates in this procedure to the extent required to provide a section thereof which substantially corresponds to the size of the lid desired. Then, the party drawing the lid out can very simply strike the multi-layered structure with his hand immediately of and outwardly from the cutter 36 and the multi-layered structure will be found to be so strong and integrated that there will be a sharp and clean separation of the drawn out lid from the following superposed film and foil sheet elements. Of course, the lid can then be dropped over and its outer peripheral edges immediately applied to the peripheral edge of the pan rimming the opening thereto to effect, on contact, a seal of the lid to the pan. This is made clear in FIG. 3 of the drawings, as is the ability provided by the character and nature of the lid of the invention to peel the lid back for a view of the receptacle contents, to the extent required, and then reseal the lid about and to the pan 52.

While the embodiment of the lid herein described and illustrated is shown as consisting of only two layers, it will of course be obvious that there may be additional intervening layers, if required for a particular application. It should also be evident that the principles, apparatus and method of the invention, as well as the function of a lid as herein illustrated can obviously be otherwise created and be utilized, as to its basic features, for applications other than that herein demonstrated.

The most inobvious product of the invention is that it has been found to provide a super wrap for food items in pans the contents of which will be subsequently frozen and eventually cooked, baked and/or otherwise heated prior to serving.

As far as catering is concerned, the invention very inexpensively and very simply eliminates the multifaceted waste inherent in the normal conduct of the caterers business. It eliminates waste of food, waste of time, waste of manpower and waste of money, also, in the baking, heating and cooking cycle and the handling thereof.

It is worthwhile to further point out that in providing a lid per the invention, the inner film layer is an effective deterrent to high acid foods eating through or corroding the foil of the outer layer of the lid during both pre-baking and post-baking storage. At the same time the foil effectively protects the film, during cooking or baking, from shrinkage and tearing as it serves as a binding agent to firmly hold the film in place and strengthen its relation to the pan or other receptacle to which it applies. The strength of the structure is that significant that should there be a split or crack in either of the layers, the composite will still serve admirably and provide the benefits and achieve the objectives of the invention as set forth in the summary of the invention first stated. It is an asset to the caterer in that the pressure dome which the lid creates preserves a quality of food and its natural content and juices while substantially reducing the time for its preparation for serving. The caterer is thus enabled to maintain a high quality operation and to handle large orders of good which must be cooked, baked or otherwise heated in a limited period of time.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiment of the invention in which an exclusive property or privilege is claimed are defined as follows:

1. A disposable lid for pans, pots and other receptacles, particularly advantageous for use in ovens, comprising a plurality of layers of thin flexible material, the outer of said layers being a heat reflective foil and an inner of said layers being a relatively thin plastic film the body of which, per se, has a direct bearing contact with and an adherence, at least in part, to said outer layer of foil to form therewith a unitized sheet structure distinguished by the absence of adhesive and the absence of a modification of said inner layer, said sheet structure being adapted to adhere to surface portions of the receptacle to which it applies.

2. A disposable lid for pans, pots and other receptacles as in claim 1 characterized in that said layers are constructed and arranged to provide a sheet structure conforming in its application to a receptacle to bridge an opening thereto and sealingly attach and contour to the configuration of that portion of the receptacle bounding said opening, thereby to seal therein the contents of the receptacle.

3. A lid according to claims 1 or 2 characterized in that said outer layer is a thin sheet of foil and said inner layer is a thin sheet of plastic film having per se the property of sealingly attaching to a surface of a pan, pot or other receptacle on contact.

4. A disposable lid for pots, pans and other receptacles according to claims 1 or 8 characterized in that said plurality of layers consists of superposed layers of aluminum foil and thin plastic film which are adhered one to the other with direct surface contact of at least portions thereof without the benefit of intervening materials to produce adhesion therebetween.

5. A disposable lid as in claim 1 wherein said layers consist of two layers, one of which is a heat reflective metal foil and the other a thin plastic film directly, substantially smoothly and substantially coextensively abutted to said foil.

6. A disposable lid as in claim 1 wherein said plurality of layers is comprised of sheet-like material respectively of aluminum foil and plastic film, the sheets of which are adhered to one another and remain adhered under conditions of ambient temperature and without intervening adhesive materials or modification of their original structure.

7. A disposable lid as in claim 1 characterized in that the inner of said layers is a plastic film material adapted on body contact to form a seal for a receptacle and its contents but normally subject to breakdown and deterioration when subjected to a predetermined heat level in an environment such as that formed within an oven in high temperature baking and other heating procedures and said outer layer is a foil providing a protective shield preserving the structural integrity of said plastic film material in the application of said lid to, over and in sealing relation to a receptacle.

8. Means for providing a disposable lid for pans, pots and other receptacles, particularly advantageous for use in ovens, comprising a plurality of layers of thin flexible material, the innermost of said layers being a thin plastic film providing means for attachment thereof to the receptacle to which said lid is applied, and the outermost of said layers being heat reflective, said layers per se having direct contact adherence therebetween and forming thereby a unitized sheet-like structure usable as a whole or selectively separable into segments thereof each of which is adapted to cover the opening to a receptacle and have portions thereof, provided by said thin plastic film, adheringly contact portions of the receptacle which bounds said opening, thereby to essentially seal said opening.

9. Lid structure as set forth in claim 8 wherein said sheet structure comprises two layers of said flexible material the innermost of which is in a substantially coextensive relation to the inner surface of the outer layer and in connecting adherent relation to at least portions thereof to provide therewith a substantially integrated structure devoid of intervening adhesive or structural breakdown of the layers in any respect.

* * * * *

UNITED STATES PATENT AND TRADEMARK OFFICE
CERTIFICATE OF CORRECTION

PATENT NO. : 4,477,509

DATED : October 16, 1984

INVENTOR(S) : Joseph J. Mott

It is certified that error appears in the above-identified patent and that said Letters Patent is hereby corrected as shown below:

Col. 3, line 44, -- a -- is inserted following "is".

Col. 6, line 31, -- is -- is inserted following "which".

Signed and Sealed this

Second Day of July 1985

[SEAL]

Attest:

DONALD J. QUIGG

Attesting Officer

Acting Commissioner of Patents and Trademarks